W. J. MIERLY.
HAME HOOK.
APPLICATION FILED APR. 23, 1907.
946,763.
Patented Jan. 18, 1910.
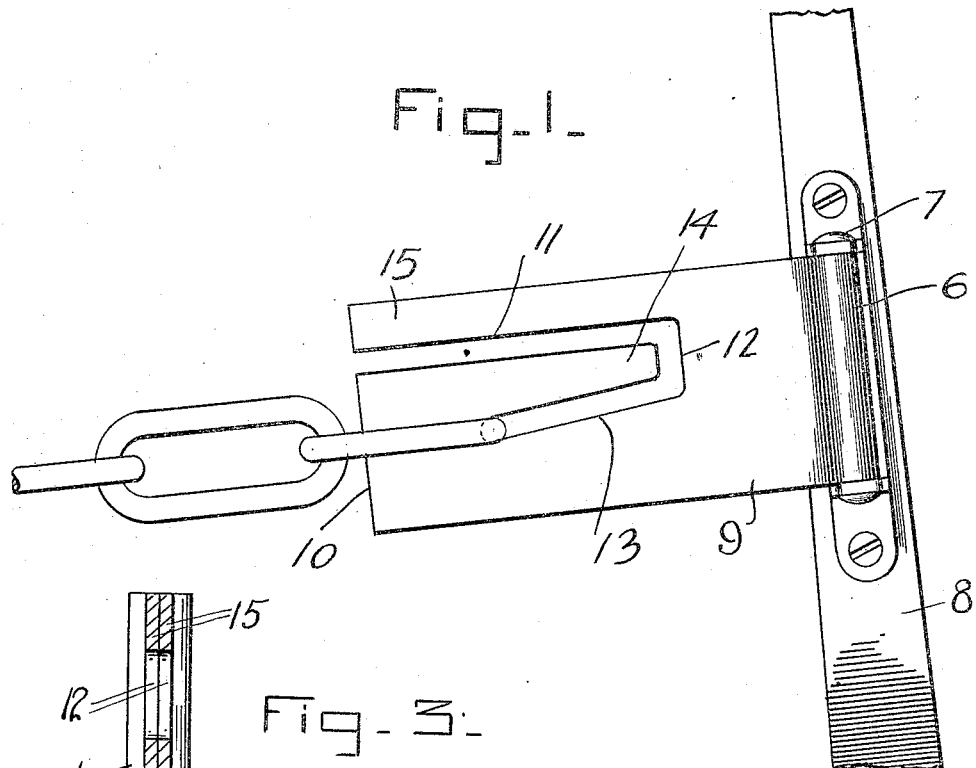
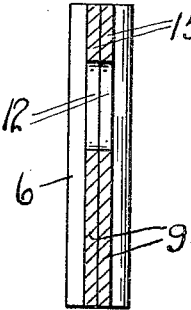
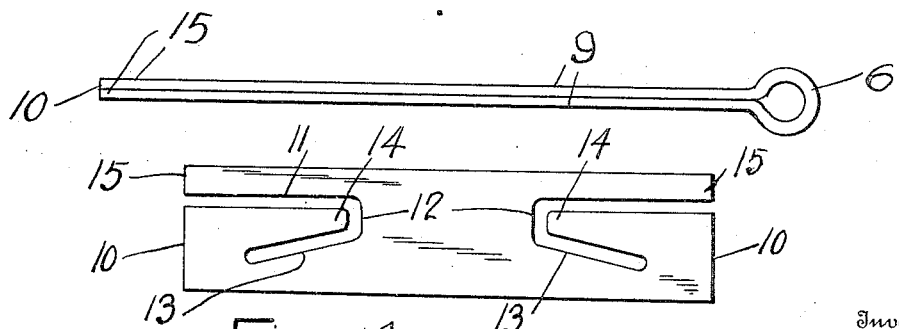
Witnesses
W. S. Rockwell
H. G. Smith
Inventor
William J. Mierly
By Chandler & Chandler
Attorneys

UNITED STATES PATENT OFFICE.

WILLIAM J. MIERLY, OF MORRILL, NEBRASKA.

HAME-HOOK.

946,763.

Specification of Letters Patent. Patented Jan. 18, 1910.

Application filed April 23, 1907. Serial No. 369,722.

*To all whom it may concern:*

Be it known that I, WILLIAM J. MIERLY, a citizen of the United States, residing at Morrill, in the county of Scotts Bluff, State of Nebraska, have invented certain new and useful Improvements in Hame-Hooks; and I do hereby declare the following to be a full, clear, and exact description of the invention, such as will enable others skilled in the art to which it appertains to make and use the same.

This invention relates to hame hooks and has for its object to provide a hook of such construction that it will be practically impossible for the chains to become accidentally disengaged therefrom.

Broadly stated the hook is formed from a blank of sheet metal bent upon itself to form an eye or sleeve for the passage of the pivot bolt upon the hame and has its members, formed by so bending the blank, slotted in a zigzag manner so as to form arms which extend above the hook with which the links of the chain trace are to be engaged, it being understood that this hook is directed forwardly and the arms rearwardly and that the slot extends from the rear edge of the device, forwardly, thence downwardly and thence retrorsely to form the link engaging hook.

In the accompanying drawings, Figure 1 is a side elevation of the hook showing the manner of connecting the same with a hame and showing the manner in which the chain is engaged with the hook, Fig. 2 is a top plan view of the hook, Fig. 3 is a vertical section through the hook taken in a plane rearwardly of the bill of the hook, Fig. 4 is a plan view of the blank from which the hook is formed.

As shown in the drawings the hook is formed from a sheet metal blank which is bent upon itself at its middle to form an elongated eye 6 which receives the usual pivot bolt 7 upon the hame 8 and the leaf portions 9 formed by so bending the blank upon itself are extended in close relation to each other with their corresponding edges coincident. The said leaf portions 9 are provided with registering slots each of which slots opens through the rear edge 10 of the corresponding leaf portion and extends forwardly as at 11, downwardly as at 12 at a point adjacent the eye 6 and thence retrorsely as at 13 but in a slightly down- wardly inclined plane as clearly shown in Fig. 1 of the drawings. The peculiar direction taken by this slot results in the formation, from each of the leaf portions, of a hook the bill of which terminates short of the forward edge of the portion 12 of the slot and is of less width than the hook at a point adjacent the point of termination of the portion 13 of the slot, the upper edge and under edges of the hook being located in forwardly converging planes. The lower edge of the portion 13 of the slot is illustrated as being parallel to the upper edge thereof and both edges are inclined downwardly and rearwardly as above stated.

From the foregoing description of my invention it will be observed that the portion 11 of the slot results in the formation of coincident arms 15 which are directed rearwardly and in a plane directly above the forwardly directed bill of the hook 14 and that consequently a trace chain will not be as liable to become accidentally disengaged from the hook 14 as would be the case if the arms 15 were omitted and it will furthermore be understood that the downwardly inclined portion of the slot 13 will aid in the attainment of this result inasmuch as the link of the trace chain which is engaged with a hook 14 is of a length less than the distance between the bill of the hook 14 and the rear edge of the leaves from which the hook is formed and the link must therefore be moved forwardly both in the slot 13 and the slot 11.

What is claimed is—
A plate comprising oppositely disposed portions having slots at each end comprising oppositely disposed portions extending from the end edge of the plate inward in a parallel direction to the top edge, then provided with two oppositely disposed portions extending downward at right angles to the first mentioned portion, then provided with two oppositely disposed portions extending downward and outward from the last mentioned portion, said plate being bent upon itself in the middle to bring the slots in alinement and being provided with a tubiform central portion constituting an eye.

In testimony whereof, I affix my signature, in presence of two witnesses.

WILLIAM J. MIERLY.

Witnesses:
L. M. EASTMAN,
W. L. MINOR.